United States Patent
Keller et al.

[11] Patent Number: 5,924,641
[45] Date of Patent: *Jul. 20, 1999

[54] MULTI-LEVEL LOAD LIMITING RETRACTOR

[75] Inventors: Gerald Keller, Shelby Township; H. John Miller, III, Macomb Township; Jon E. Burrow, Sterling Heights, all of Mich.

[73] Assignee: Breed Automotive Technology, Inc., Lakeland, Fla.

[ * ] Notice: This patent is subject to a terminal disclaimer.

[21] Appl. No.: 09/129,325

[22] Filed: Aug. 4, 1998

Related U.S. Application Data

[62] Division of application No. 08/803,967, Feb. 21, 1997, Pat. No. 5,788,177.

[51] Int. Cl.⁶ .................................................. B60R 22/28
[52] U.S. Cl. ...................................... 242/379.1; 280/805
[58] Field of Search ..................... 242/379.1; 280/805, 280/806; 297/470, 471, 472

[56] References Cited

U.S. PATENT DOCUMENTS

| | | | |
|---|---|---|---|
| 3,741,494 | 6/1973 | Fiala | 242/379.1 |
| 3,881,667 | 5/1975 | Tandetzke | 242/379.1 |
| 5,547,143 | 8/1996 | Miller et al. | 242/379.1 |
| 5,788,177 | 8/1998 | Keller et al. | 242/379.1 |
| 5,799,893 | 9/1998 | Miller et al. | 242/379.1 |

*Primary Examiner*—JOhn M. Jillions
*Attorney, Agent, or Firm*—Markell Seitzman

[57] ABSTRACT

An energy absorbing seat belt retractor having a frame; a spool on which the seat belt is wound, the spool rotationally supported relative to the frame; a first locking mechanism for initially stopping the spool from rotating in a belt protraction direction; a bias or rewind spring to retract the seat belt, and a first energy absorbing or dissipating member, associated with the first locking mechanism, for permitting the spool to rotate in the belt protracting direction subsequent to activation of the first locking mechanism for generating a reaction force to control the manner in which the spool rotates; wherein the first locking mechanism includes a mechanical inertial sensor for initiating the locking up of the first locking mechanism and wherein the retractor further includes a first non-inertial sensor (100, 200) for preventing the initiation caused by the inertial sensor.

2 Claims, 9 Drawing Sheets

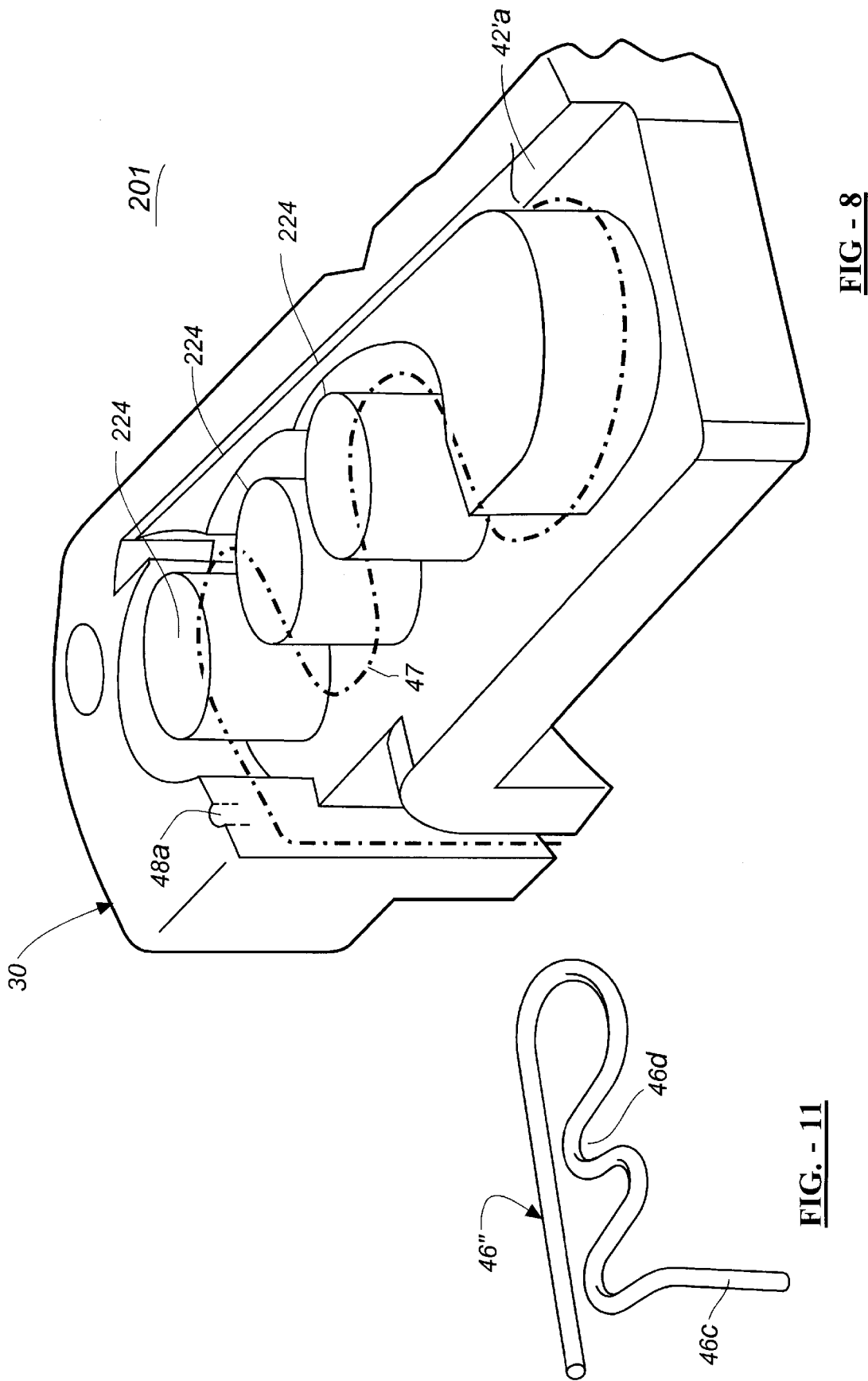

MULTI-LEVEL LOAD LIMITING RETRACTOR

This application is a division of application U.S. Ser. No. 08/803,967, filed Feb. 21, 1997.

BACKGROUND AND SUMMARY OF THE INVENTION

The present invention generally relates to seat belt retractors which include a means of absorbing or dissipating crash energy.

In a conventional seat belt retractor, a web or a vehicle (often called inertial) sensor is used to initiate the stoppage of the spool to prevent further protraction of the seat belt webbing therefrom during an accident. A second class of seat belt retractors permits the controlled protraction of the seat belt by incorporating within the retractor an energy absorption (or dissipation) mechanism. In the past these mechanisms have included crushable bushings (U.S. Pat. No. 5,547,143), deformable tubes (U.S. Pat. No. 3,881,667) or torsion bars (U.S. Pat. No. 3,741,494).

It is an object of the present invention to provide an energy absorbing retractor that has one or more load limiting levels, a retractor that may be activated either mechanically or electrically, and one which utilizes a unique energy absorbing (dissipating) mechanism.

Many other objects and purposes of the invention will be clear from the following detailed description of the drawings.

BRIEF DESCRIPTION OF THE DRAWINGS

In the drawings:

FIG. 8 illustrates an alternate embodiment of the present invention.

FIG. 11 is an isometric view of an alternate wire insert.

DETAILED DESCRIPTION OF THE DRAWINGS

Figure 1:
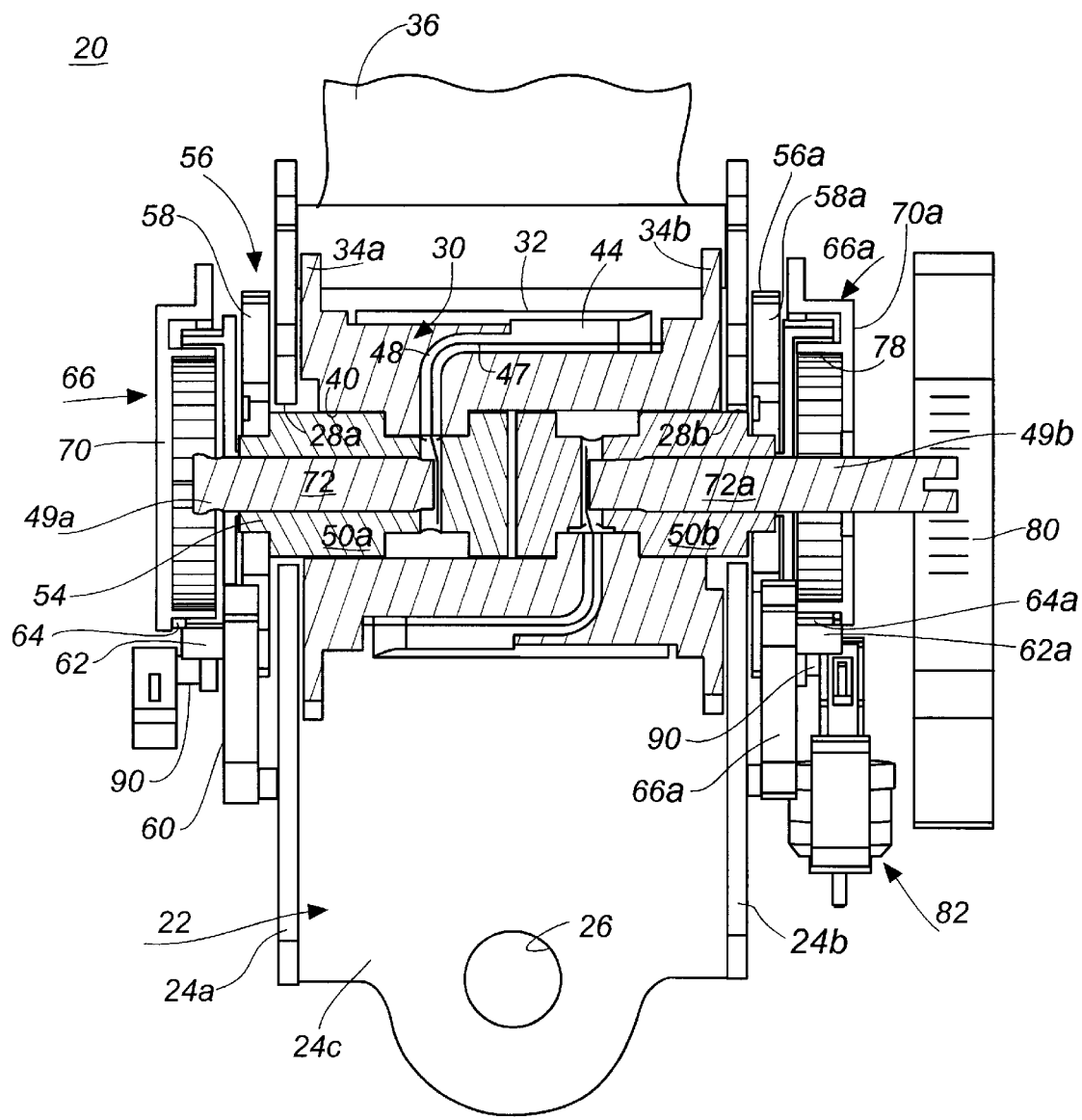
FIG. 1 is a front plan view of the present invention.

Reference is made to FIG. 1 which is a cross-sectional view of a seat belt retractor 20 constructed in accordance with the present invention. The retractor includes a U-shaped frame 22 having frame sides 24a and 24b and a rear portion 24c. Part 24c includes a mounting opening 26. Each side 24a and b includes a respective circular opening 28a and 28b. (see FIGS. 3 and 4.) Rotatably supported on the frame 22 is a spool generally shown as 30. The spool includes a center portion 32 and flanges 34a and 34b. A length of seat belt webbing 36 is wound upon the center part of the spool. An inner end of the seat belt 36 is received within a slot formed within the spool in a known manner. The spool 30 further includes a central through bore 40.

Figure 6:
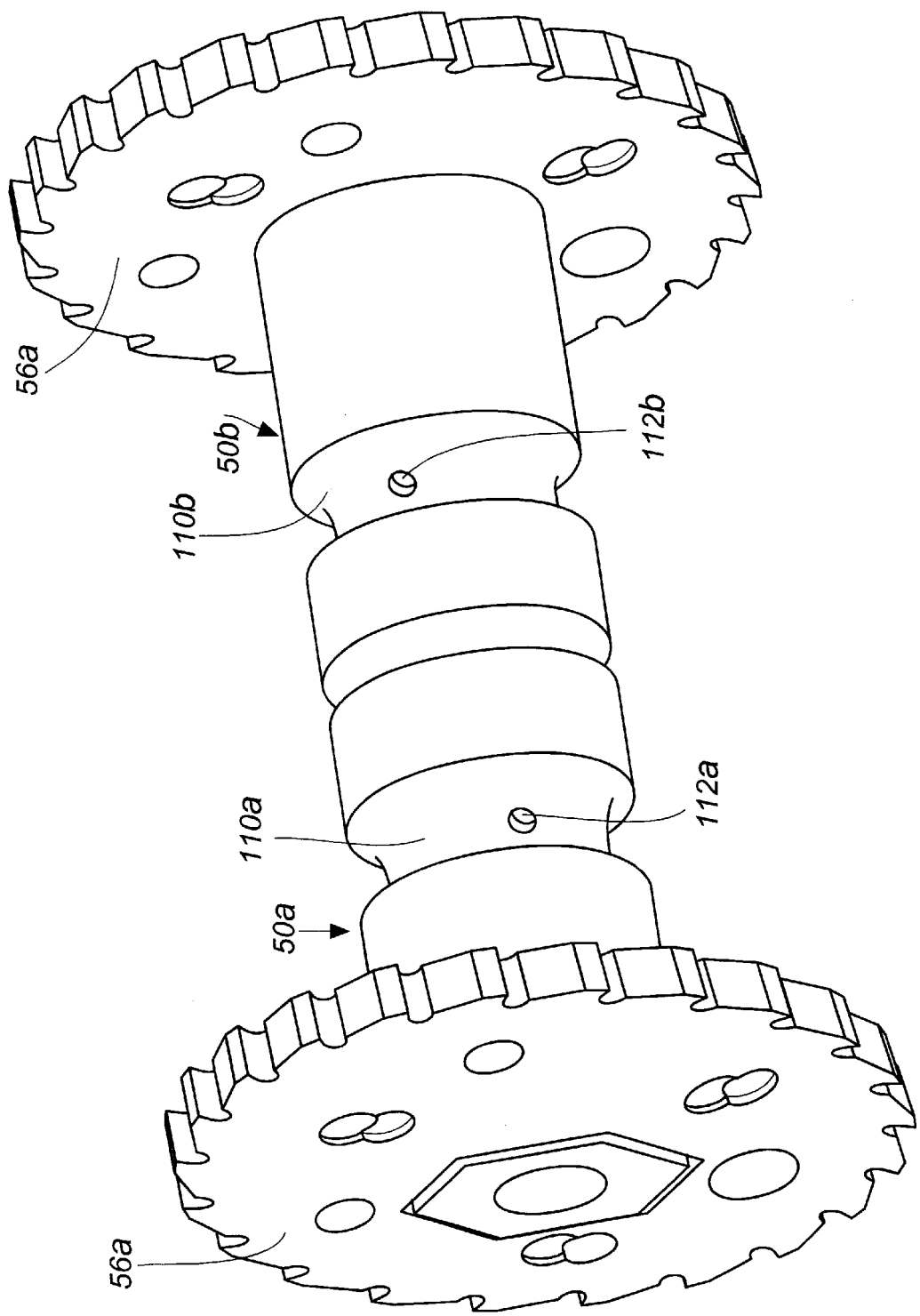
FIG. 6 is an isometric view of the energy absorbing mechanisms used herein.
Figure 7:
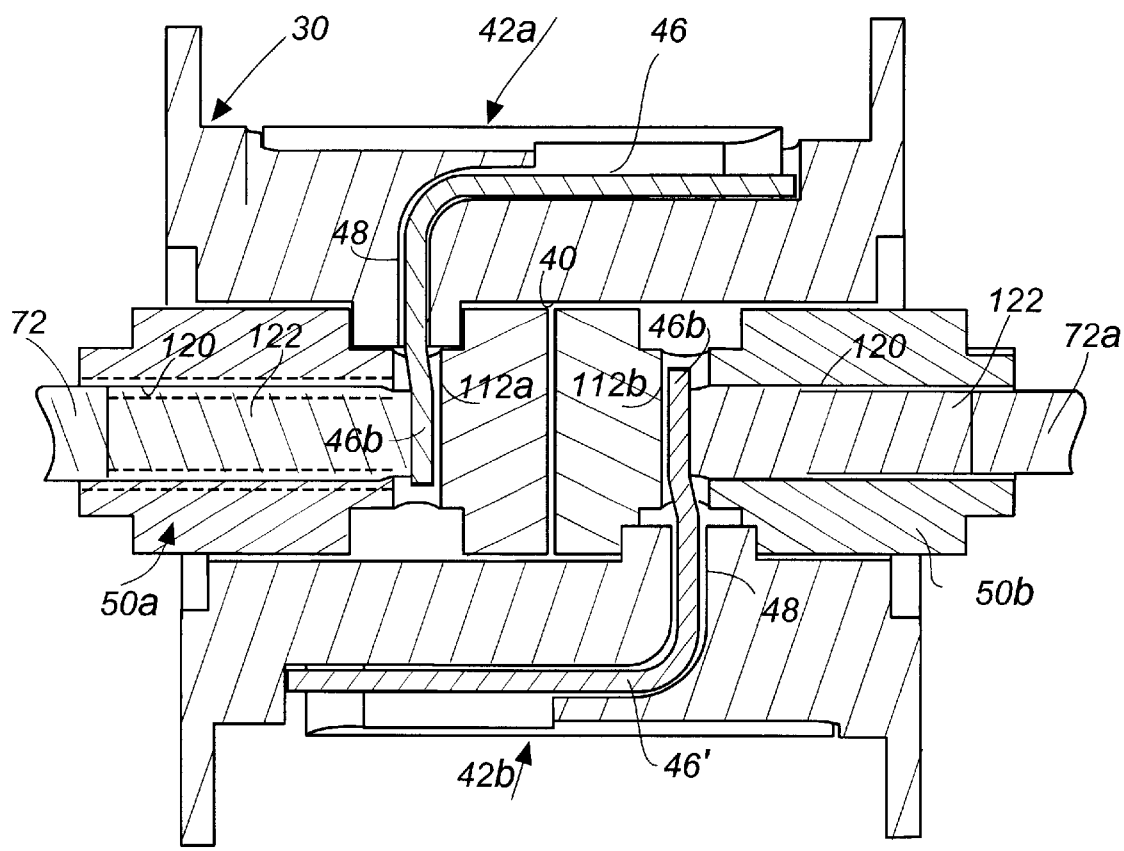
FIG. 7 is a front cross-sectional view of part of the energy absorbing mechanisms.

The retractor 20 includes two independently activated energy absorbing mechanisms 49a,b which will permit the spool 30 to rotate relative to the corresponding axle parts 50a,b when the seat belt is loaded by the occupant during an accident. The energy absorbing mechanisms will each generate a reaction force impeding the rotation of the spool and protraction of the seat belt in a controlled manner. The energy absorbing mechanisms, as described below will permit the generating to two different levels of controlled reaction force if activated independently and a third level of reaction force if activated simultaneously. The primary components of these energy absorbing mechanisms include the axle parts 50a and 50b, two corresponding wire or metal strip holding or retaining mechanisms and a pre-formed wire or metal strip insert linking each axle part and wire holding mechanism (on the spool 30). The controlled reaction forces generated by the retractor 20 are developed as each wire (or strip) insert 46, (46' or 46"), shown in FIGS. 6 and 7 is pulled through and out of a respective holding or retaining mechanism as the spool 30 rotates relative to the axle parts 50a,b after they are locked in place.

Figure 9:
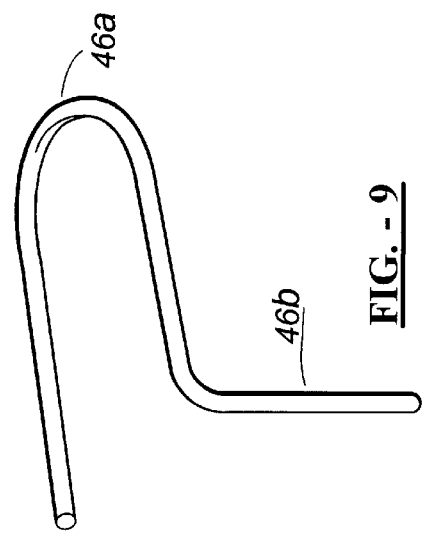
FIG. 9 illustrates a pre-formed wire insert.
Figure 5:
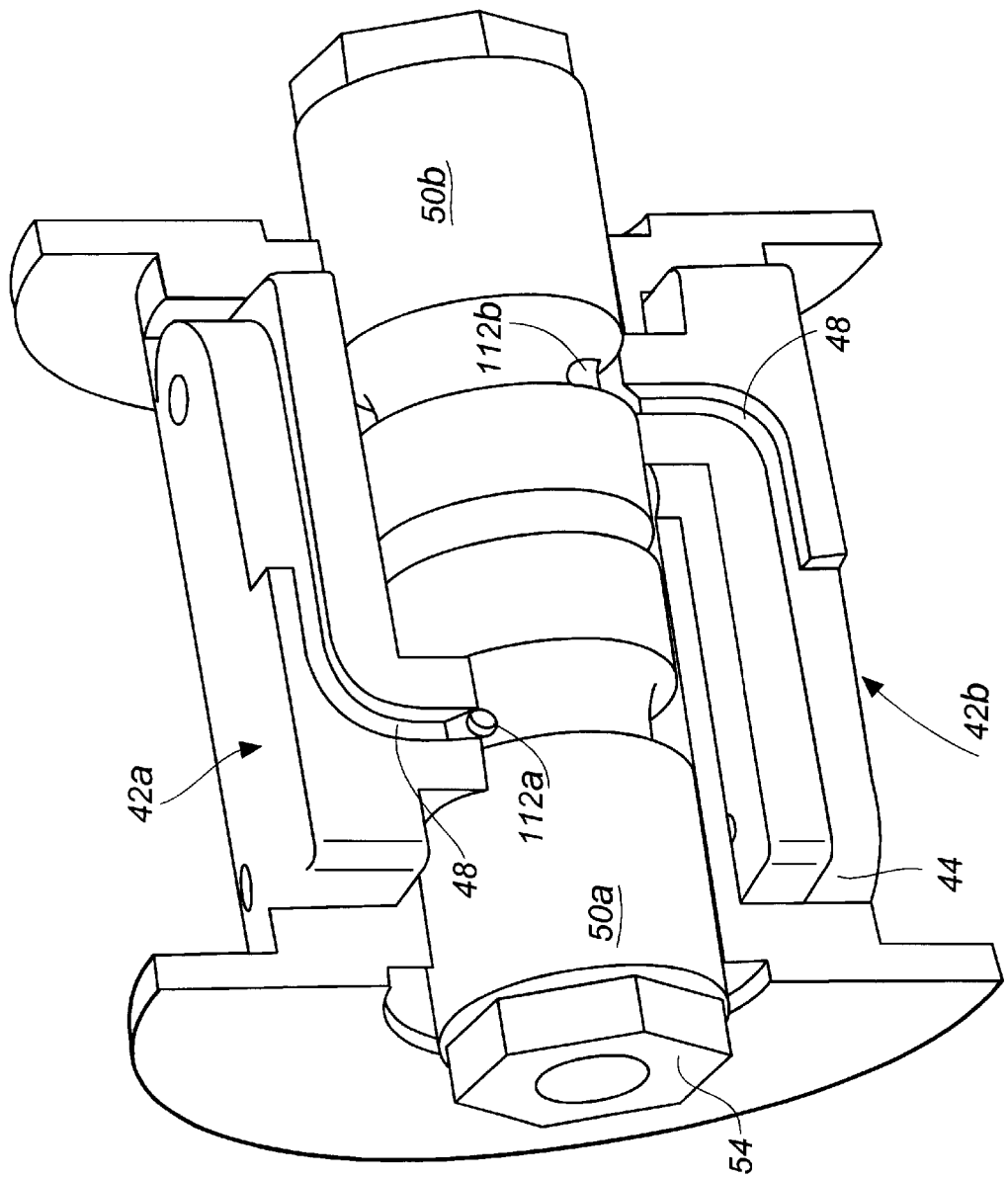
FIG. 5 is an isometric, cross-sectional view of a spool and energy absorbing mechanisms.

Situated on the periphery of the center portion 32 of the spool 30 are two wire holding or retaining mechanisms 42a and 42b. The spool of the present invention can be fabricated as a casting with the holding and retaining mechanisms formed as an integral part thereof or these mechanisms can be inserted within recesses on the periphery of the spool. These mechanisms are shown in greater detail in FIGS. 2 and 5. In one embodiment the wire holding mechanism includes a U-shaped trough 44 (see FIG. 2) in which is received the pre-formed, bent metal wire insert (or wire) 46. For ease of illustration, the centerline 47 of the wire or strap insert 46 (and 46') is only shown in the trough. The U-shaped groove or trough 44 transitions into a radially disposed passage 48 extending through to the bore 40. As can be seen, the wire insert 46 of FIGS. 2 and 9 includes a U-shaped portion 46a which is laid within trough 44, an extending portion 46b extends through the radial passage 48. One end 48a of the radial passage which intersects the trough 44 is visible in FIG. 2.

Figure 2:
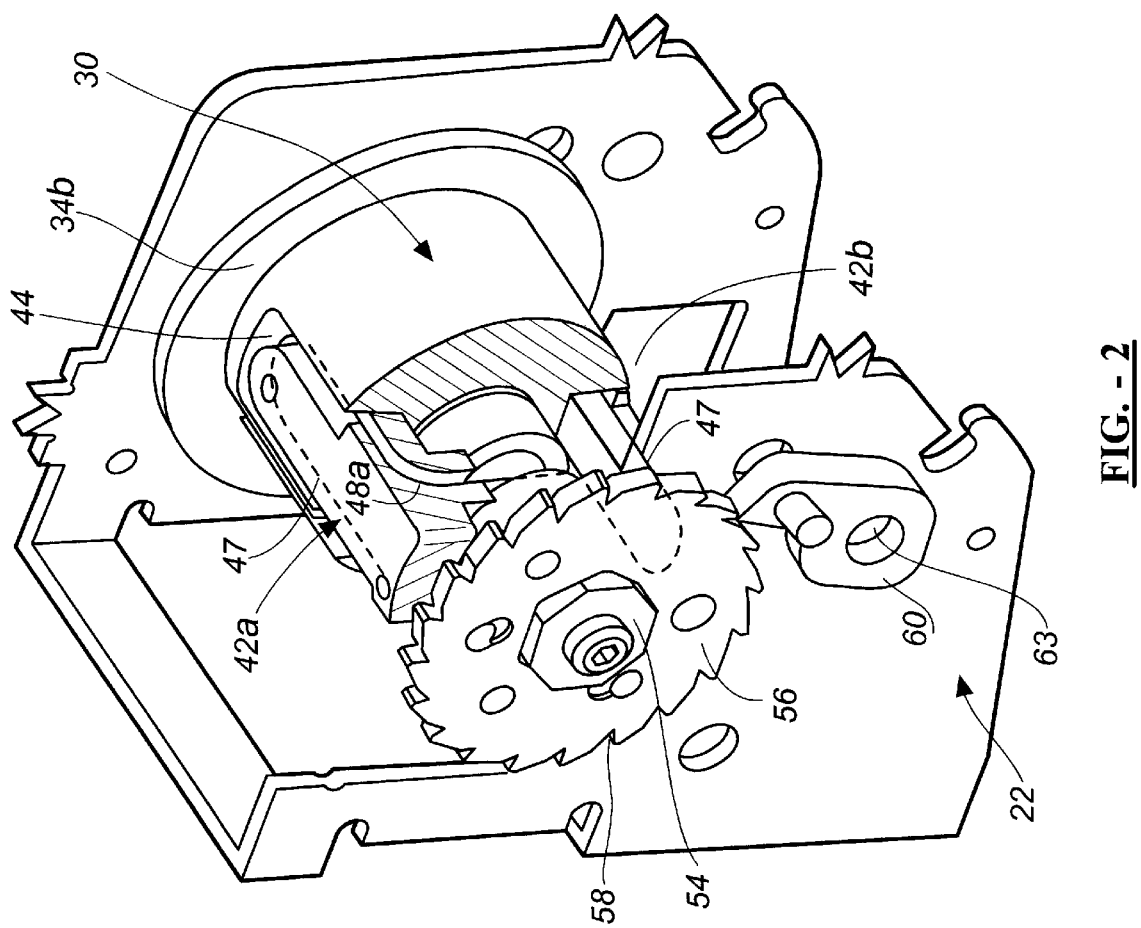
FIGS. 2 is a left side partial isometric view illustrating a lock wheel, lock cup and holding mechanism and locking pawl.

As mentioned, the holding and receiving mechanisms 42a,b and wire (or wire insert) 46 forms part of the energy absorbing mechanisms used in retractor 20. As can be seen in FIG. 1, the retractor 20 includes a second wire receiving and holding mechanism 42b which may be substantially identical to or different from the wire mechanism 42a (as an example the alternate construction of FIG. 8). A pre-formed wire insert 46' is inserted within the wire holding mechanism 44b (its centerline 47 is shown in FIG. 2). In the preferred embodiment, the pre-formed wire inserts 46 and 46' are semi-rigid, metal wire parts made from spring steel, a steel alloy or tungsten and may include circular, square or other cross-section such as oval or rectangular which would yield different levels of resistance as the wire is pulled through the trough and perhaps cut into the surrounding walls thereof. As will be seen below the mechanical characteristics of the wire insert as well as the shape of the curves or twisted passages of the retaining mechanism define the level of the reaction force generated to oppose the rotation of the spool 30. The physical characteristics of the wire inserts 46 and 46' can be the same or different to achieve the same or different levels of reaction force. This is also true of the wire holding and retaining mechanisms 42a,b. An alternate holding mechanism and wire insert is shown in FIGS. 8 and 11.

As mentioned above, the spool 30 is rotationally supported upon the frame 22. This is accomplished by utilizing the two axle portions or parts 50*a* and 50*b*. The axle parts extend through respective openings 28*a* and 28*b* which provide bearing surfaces to rotationally support the axle parts 50*a* and 50*b*. Each axle part 50*a* and 50*b* includes a hexagonally-shaped, narrowed end portion 54 (also shown in FIG. 5) upon which is mounted a respective lock wheel 56 (and 56*a*), shown in FIGS. 1 and 2, having lock teeth 58 (and 58*a*) thereon. The lock teeth are engaged by rotationally mounted lock pawls 60 (and 60*a*) pivotal supported on opposing sides of the frame 22 (see FIGS. 1, 3, and 4). Each lock pawl 60, and 60*a* is pivoted on a pin 63, and includes an extending pin 62 which is received within a cam surface 64 (or 64*a*) of a respective lock cup 66 or 66*a* located on opposite sides of the retractor frame. One such lock cup is shown in European Patent Application EP 0 228 729 A1 which is incorporated herein by reference.

Each lock cup 66 or 66*a* includes a plate 70 (or 70*a*) that is loosely received about a corresponding axle extension. In the present case, such an axle extension is shown as an extending stub axle 72 which extends from axle part 50*a*. Extending from axle part 50*b* is a second stub axle 72*a* which acts as a spring arbor to receive an end of a return spring 80 which is used to rewind the seat belt 32 upon the spool 30. The return spring 80 is housed in a spring cage (not shown) positioned outboard of the lock cup 66*a* and appropriately secured to the frame 22 to provide a reaction surface for an end of the spring 80. It should be appreciated that the spring 57 is not shown in FIG. 3 to prevent cluttering of the drawing.

Secured to the stub axle 72*a* and rotatable therewith is a ratchet wheel 74*a* having a plurality of teeth 76*a*. A similar ratchet wheel 74 with teeth 76 rotates with stub axle 72. While not illustrated in the figures, the lock cup 66*a* (attached to frame side 24*b*) includes a web sensor comprising an inertial mass is located within the lock cup, which moves to engage teeth 78 of the ratchet wheel or on an inner surface of the lock cup, as known in the art, when the seat belt webbing is protracted at a rate greater than a predetermined level, thereby linking the lock cup plate 70*a* of lock cup 66*a* with the ratchet wheel 74*a* and axle 72*a*, causing the lock cup 66*a* to rotate, thereby moving the lock pawl 60*a* into engagement with its mating lock teeth.

Figure 3:
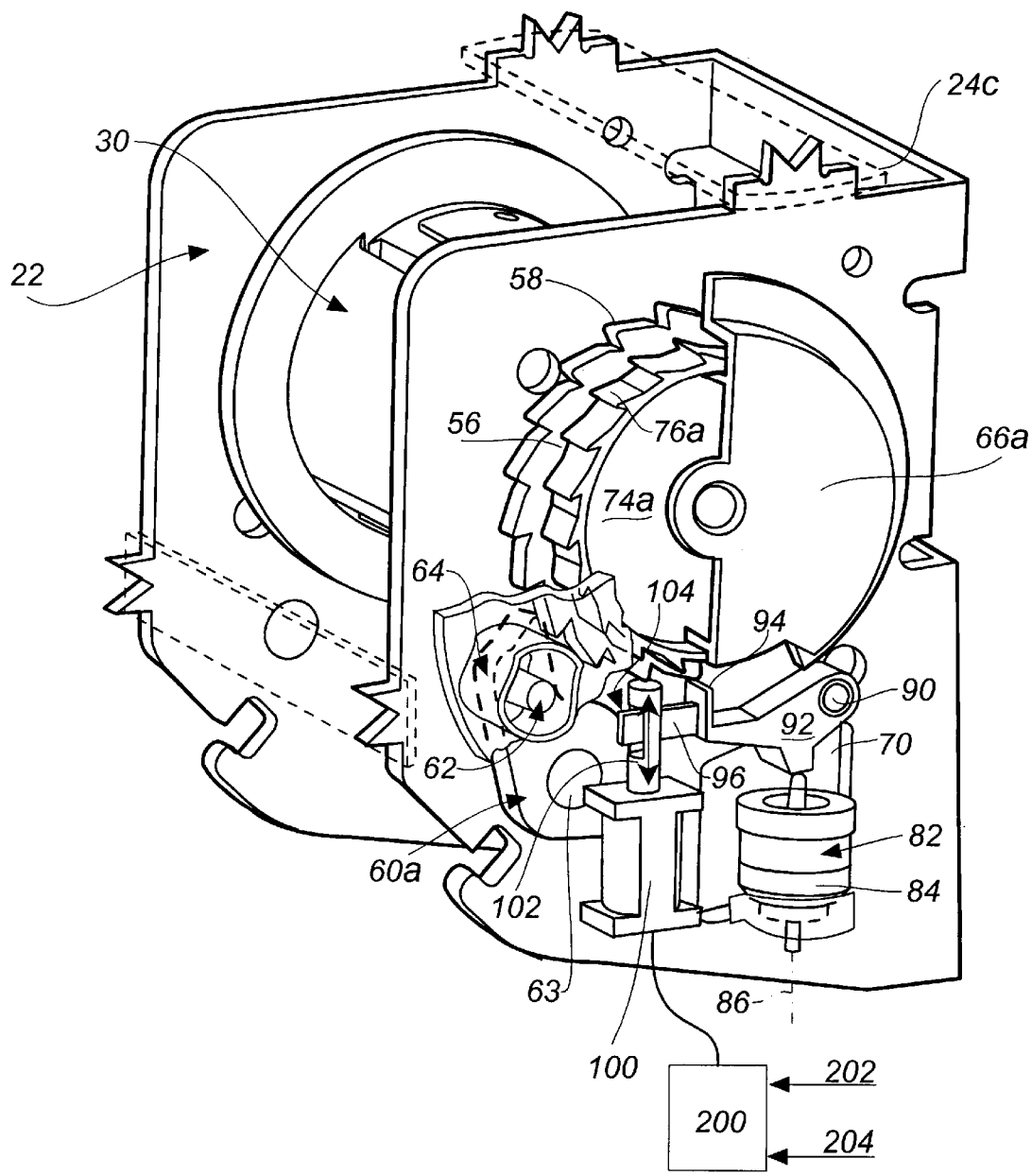
FIG. 3 is a right side isometric view illustrating a lock cup, vehicle sensor and solenoid.
Figure 4:
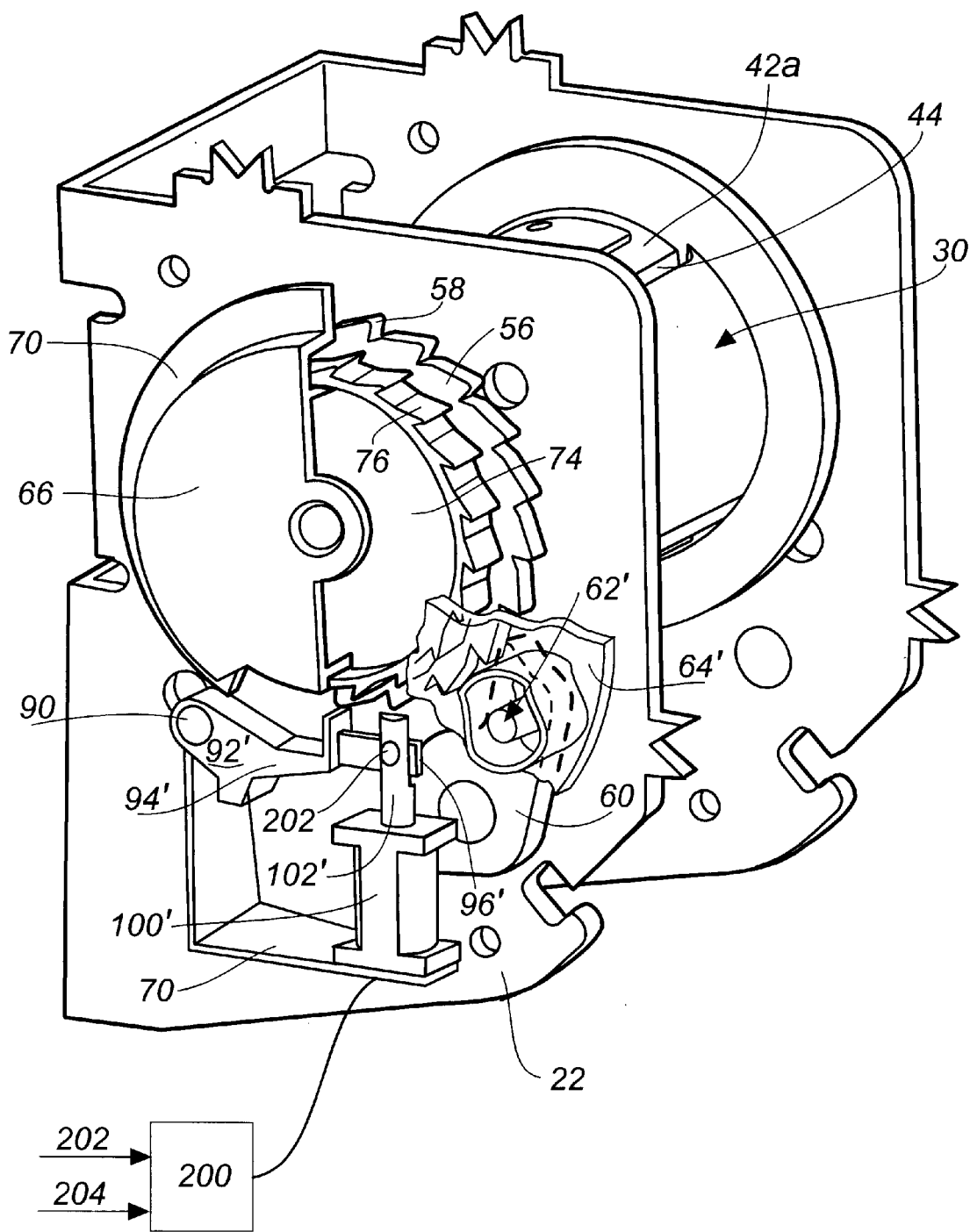
FIG. 4 is a left-side isometric view of a retractor illustrating a locking mechanism and solenoid.

As can be seen from FIG. 3, the retractor further includes a vehicle (inertia) sensor generally shown as 82 which is associate with lock cup 66*a*. In the illustrated embodiment this vehicle sensor is a standing man sensor, of known construction, having an inertial element 84 which tips relative to a center axis 86 when the vehicle decelerates greater than a predetermined level. The vehicle sensor 82 is situated upon frame side 24*b*. Pivotably mounted to the plate 70*a* about pin 90 is a sensor pawl generally shown as 92. The sensor pawl includes a toothed portion 94 which is moved into engagement with the teeth 76*a* and an extending arm 96. Also situated and mounted upon the frame side 24*b* is an electrically responsive solenoid 100 having a movable plunger 102 with a slot 104 formed therein. As can be seen, the slot 104 is received about the arm 96. The slot 104 is oversized such that during normal operation of the vehicle, motion of the sensor pawl 92 is not interfered with by the plunger 102. During normal operation of the vehicle involving a relatively high level of vehicle deceleration (which might occur in an accident or as a result of severe brake application), the inertial sensor will tip which in turn causes the sensor pawl 92 to rotate about its pivot 90 moving its toothed end 94 into mating engagement with the teeth 76*a* on the ratchet wheel 74*a*. This coupling links the lock cup 62*a* to the axle, causing the lock cup 66*a* to rotate, moving the lock pawl 66*a* into engagement with the lock wheel, preventing protraction of the seat belt webbing from the spool 30.

Lock cup 66, located on side 24*a* of the frame, supports a second solenoid 100' having a plunger 102' that is pivotably connected via pin 202 to a sensor pawl 92' (which is substantially identical to sensor pawl 92) that is pivoted about a pin 90 associated with the plate 70 of the lock cup 66. Associated with this lock cup 66 is another ratchet wheel 74 having teeth 76. Upon activation of solenoid 100', the sensor pawl 92' is moved upwardly into engagement with the teeth 76, coupling the lock cup 66 to the motion of the axle part 50*a*, thereby moving pawl 60 into engagement with its corresponding lock wheel 56.

Reference is again made to FIG. 5 and to FIGS. 6 and 7 which illustrate further details of the present invention. FIG. 6 illustrates an isolated view of the axle parts 50*a* and 50*b* and their connection with the lock wheels 56 and 56*a*. Each axle part 50*a* and 50*b* includes an annular groove 110*a* and 110*b* with a wire receiving opening 112*a* and 112*b* formed therein. The radially extending end 46*b* of each pre-formed wire insert 46 and 46' is placed into and locked to a respective opening 112*a* and 112*b*. The following describes two methods of locking the wire inert within the openings 112*a* and *b*. As an example, each axle part 50*a* and 50*b* may include a hollow threaded bore 120. A threaded plug 122 is received within the bore 120 and is driven against, to secure the end 46*b* of each pre-formed wire insert 46 and 46' to the respective axle part 50*a* or 50*b*. The stub axles 72 and 72*a* extend outwardly from the plugs 120 and may be separate parts or integrally connected.

Figure 10:
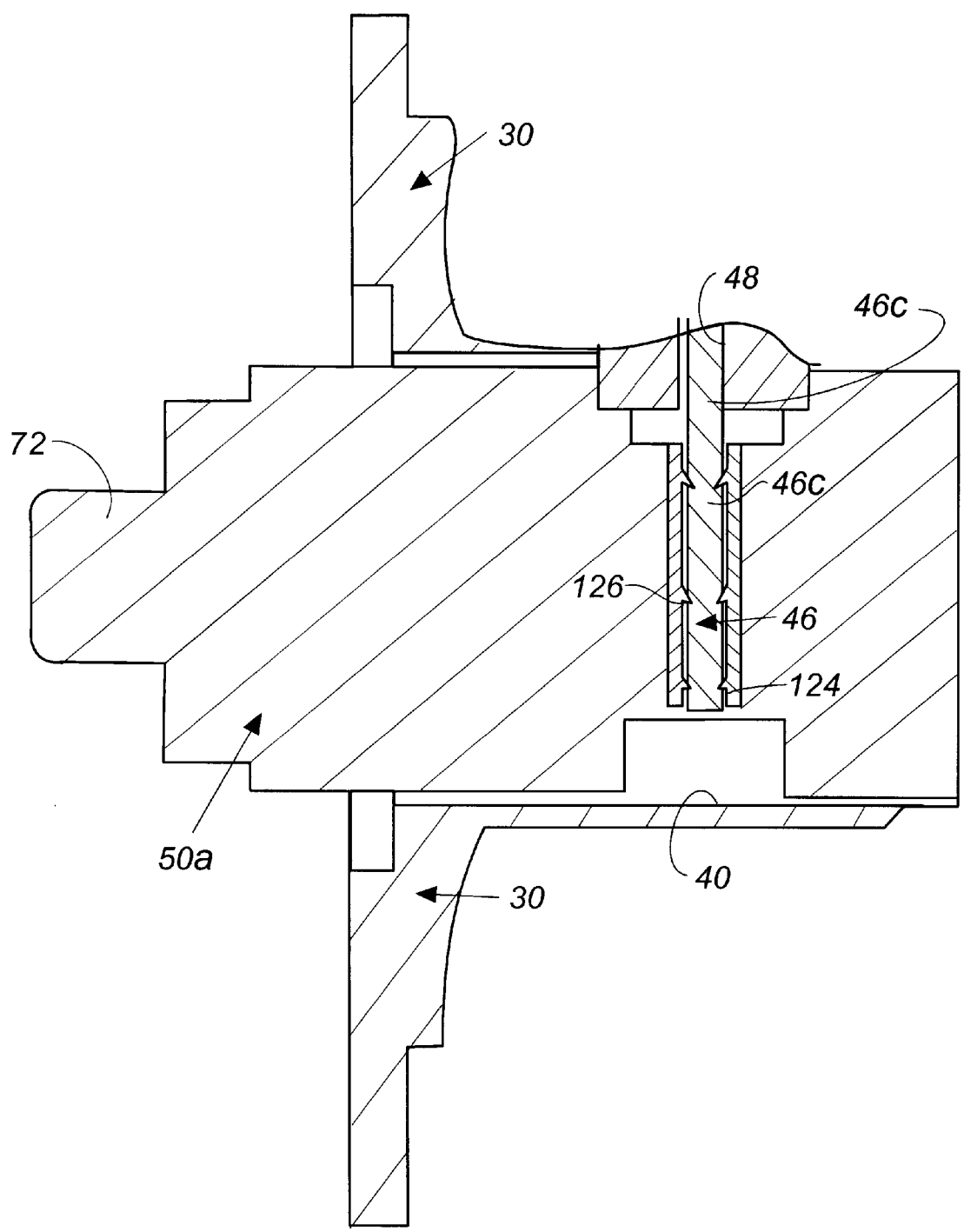
FIG. 10 illustrates an alternate wire retention mechanism.

Reference is briefly made to FIG. 10 which illustrates an alternative wire retention mechanism. As can be appreciated, the threaded bores 120 and the plugs 122 are eliminated. In this embodiment, a barbed insert 124 is received in each wire receiving bore or passage 112*a* and 112*b*. The insert 124 may include a plurality of hooks or barbs 126 to engage and lock into the end 46*b* of the respective pre-formed wire insert 46 or 46' retaining it within the axle part 50*a* or 50*b*.

The following illustrates the operation of the present invention. During the normal operation of the retractor, the webbing is protracted as the occupant moves forward and retracted by the rewind spring as the occupant returns to the normal seated position. As mentioned above, the retractor includes a mechanical locking mechanism comprising a web sensor and a mechanical vehicle sensor 82 associated with lock cup 66*a*. During the normal operation of the vehicle, there may be instances where the webbing is pulled out at a rate which will activate the web sensor, or alternatively, the vehicle is decelerated at a level which would activate the mechanical vehicle sensor 82 thereby bringing the associated locking pawl 60*a* into locking engagement with its lock wheel, thereby halting the protraction of the seat belt webbing.

There will be instances, however, where the vehicle is involved in a crash. Such a crash, as sensed by an appropriate crash sensor (not shown), will involve deceleration levels that are typically greater than that which would be achieved during normal operation of the vehicle.

On sensing a crash of a first level, an electronic control unit, generally shown as 200, associated with a crash sensor 202 or alternatively indirectly sensing such crash by determining the load in the seat belt (or on the retractor), via a strain sensor or the like 204, will generate a first activation signal which will cause the plunger 102' to move upwardly a sufficient amount, such that the arm 96' of the sensor pawl 92' will be lifted into engagement with the lock teeth, thereby coupling the lock cup 60 to the retractor axle and causing the lock pawl 60 to move into engagement with the lock wheel, thereby momentarily locking the spool and prohibiting the protraction of the seat belt. The action of the solenoid 100' will typically precede similar motion of the mechanical inertia sensor 82 which would also move the pawl 92 into engagement with the ratchet wheel 74a. During the crash, the occupant will typically move forwardly, loading the seat belt. These forces are transmitted directly to the webbing 36 and to the spool 30. These crash forces or torques input to spool 30 will cause the spool to rotate relative to the axle part 50a. As these forces or torques increase, the spool 30 will rotate relative to the now locked axle part 50a. This rotation will be impeded by the pre-formed wire insert 46 which interconnects axle part 50a to the spool 30. As the crash forces increase the spool 30 will be rotated in a direction of seat belt protraction and resisted by the reaction forces generated as the wire 46 is wound about axle part 50a and is pulled through tortuous channels of the wire holding mechanism 46a and wound about part 50a. In this manner, during a relatively first level crash, the manner in which seat belt is permitted to protract and the forces input to the occupant via the seat belt are controlled.

If the ECU 200 determines that the crash is at the first level, the ECU will also generate a control signal which causes the plunger 102 to be maintained in its lower position, thereby preventing the activation of lock cup 66 by the mechanical sensor 82.

If the ECU 200 determines that the vehicle is involved in a crash of a greater second level, the ECU will generate a control signal to activate solenoid 100 which is carried by lock cup 60a situated relative to frame side 24b. Upon activation of solenoid 100, the sensor pawl 92 is moved upwardly into engagement with the teeth 76a, coupling the lock cup 66a to the motion of the corresponding end assembly 210, thereby moving pawl 60a into engagement with its corresponding lock wheel 56 locking the assembly part 50b. During this crash, the pre-formed wire insert 46' will be wound about axle part 50b generating (as is the case with axle part 50a) a predetermined reaction force to control the forward motion of occupant and to control the dynamics of the protraction of the seat belt in the manner similar to that described above.

It may be desirable, however not necessary, that the diameters of the wires 46 and 46' or the shape of the holding and retaining mechanisms 24a,b be different so that the retractor may generate a different level of reaction force retarding the motion of the occupant in correspondence to the activation of the lock cups 66 and 66a.

If the ECU 200 determines that the crash is of a significantly high level requiring the generation of a high retarding force on the seat belt, this will be accomplished by simultaneously generating control signals to both solenoids 100 and 100', thereby causing both lock pawls 60a and 60b to respectively lock its corresponding lock wheels 56, 56a. As can be appreciated, any rotational motion of the spool will not be resisted by the forces necessary to pull the pre-formed wire inserts 46 and 46' through the channels of their respective holding members.

In summary, it can be seen that the present retractor can generate a multi-level retarding force by activating one or the other of the energy dissipating members of the present invention, or alternatively, can generate a third level of retarding force by activating both energy absorbing members simultaneously. It should also be appreciated that by virtue of the incorporation in the present invention of the solenoid 100 and inertial mass sensor 82, which both act upon and move the sensor pawl 92, that the present invention provides a high degree redundancy in its operation in that if for some reason the ECU 200 could not or does not generate the appropriate activation signals to the solenoids 100 or 100', the inertial sensor 82 will have moved the sensor pawl 92 into locking readiness with the ratchet wheel 74a, which in turn causes lock pawl 60a to move into engagement with its corresponding lock wheel. If the forces that are generated on the seat belt are sufficiently high, the spool 30 will tend to rotate and in doing so be resisted by the energy absorbing mechanism as the pre-formed wire insert 46 is pulled and twisted through the various channels of the associated parts.

Reference is again made to FIG. 8 which is a plan view of an alternate wire holding mechanism 220. As can be appreciated, the U-shaped channel of the holding mechanism 42a or 42b has been replaced by a first U-shaped channel 42a and a plurality of pins 224. The pre-formed wire insert 42" (see FIG. 11) is formed to be received within the U-shaped channel 22a and bent or twisted about the pins 224 (only the centerline 47 of the insert 46" is shown in FIG. 8) which act as rollers and the end of the insert 42" is received through the radial slot 48 in the spool. As can be appreciated, this type of configuration in combination with the choice of wire material has the capability of generating a significantly greater reaction force due to the higher level of force needed to pull the wire insert 46" through the serpentine path between the pins or rollers 224.

Reference is again to FIG. 11 which illustrates an isometric view of the pre-formed wire insert 46" which would be used in conjunction with the wire holding and retaining mechanism shown in FIG. 8. The insert 46" includes a serpentine wire path 46d corresponding to the channels or passages in the holding and retaining mechanism 201.

As can be appreciated from the above, the level of control force generated by the energy absorbing mechanisms to oppose the rotation of the spool 30 and permit the controlled protraction of the seat belt will vary with the size of the wire insert and the construction of their retaining mechanism. Further, it may be desirable to size the wire insert and retaining mechanism of the energy absorbing mechanism associated with the mechanical inertia sensor to generate a level of control force associated with a moderate or high level crash as the inertia sensor provides for redundancy and to size the other (electrically activated) energy absorbing mechanism to generate a control force when the vehicle is involved in a lower level accident.

Many changes and modifications in the above described embodiment of the invention can, of course, be carried out without departing from the scope thereof. Accordingly, that scope is intended to be limited only by the scope of the appended claims.

We claim:

1. An energy absorbing seat belt retractor having
a frame;
a spool on which the seat belt is wound, the spool rotationally supported relative to the frame;
a first locking means for initially stopping the spool from rotating in a belt protraction direction;
bias means to retract the seat belt, and
a first energy absorbing or dissipating means, associated with the first locking means, for permitting the spool to rotate in the belt protracting direction subsequent to activation of the first locking means for generating a reaction force to control the manner in which the spool rotates;

wherein the first locking means includes a mechanical inertial sensor means for initiating the locking up of the first locking means and wherein the retractor further includes a first non-inertial sensing means (100, 200) for preventing the such initiation caused by the inertial sensor means.

2. The device as defined in claim 1 wherein the first non-inertial sensing means is operative to initiate the locking up of the first locking means independent of the action of the inertial sensor means.

* * * * *